Feb. 17, 1953  L. E. BRAYMER  2,628,529
REFLECTING TELESCOPE WITH AUXILIARY OPTICAL SYSTEM
Filed Sept. 25, 1948  2 SHEETS—SHEET 1
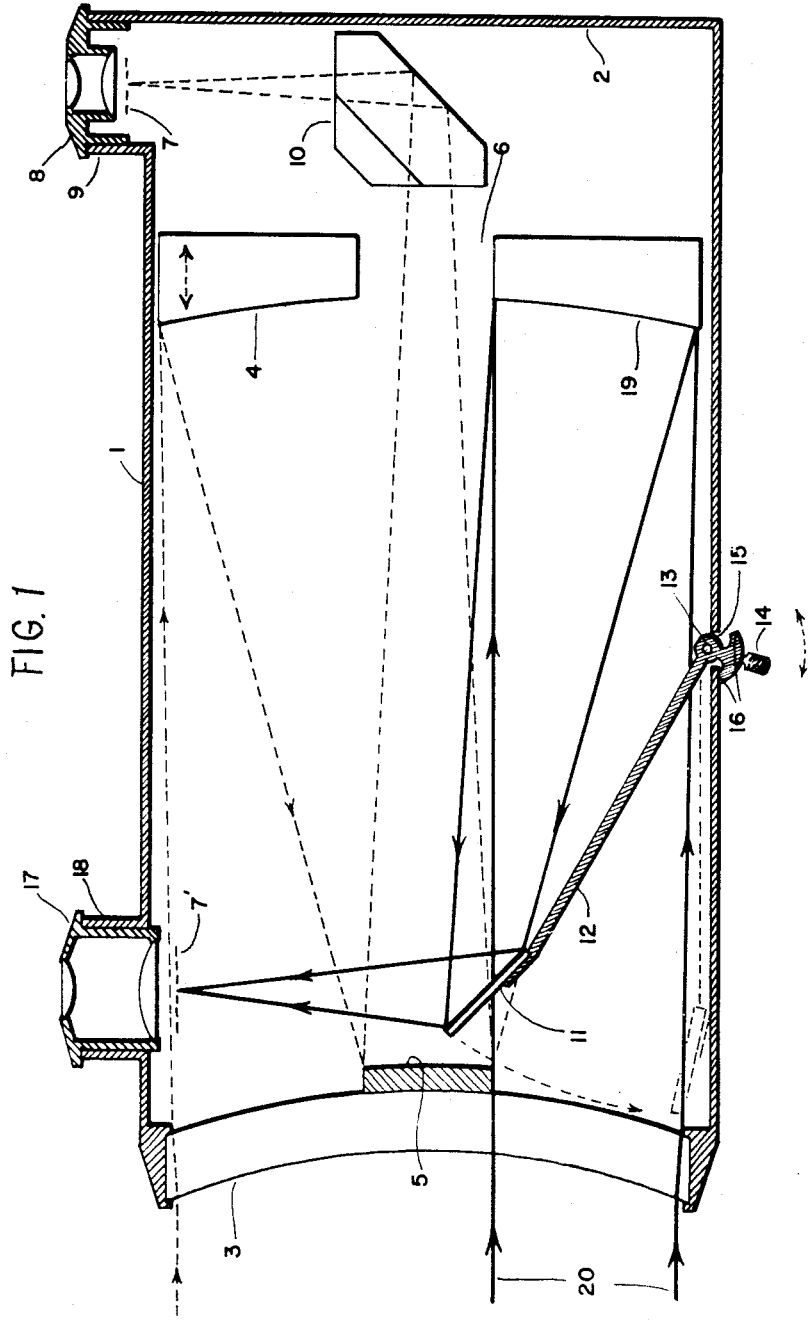
INVENTOR.
LAWRENCE E. BRAYMER
BY
his attorney Feb. 17, 1953 L. E. BRAYMER 2,628,529
REFLECTING TELESCOPE WITH AUXILIARY OPTICAL SYSTEM
Filed Sept. 25, 1948 2 SHEETS—SHEET 2
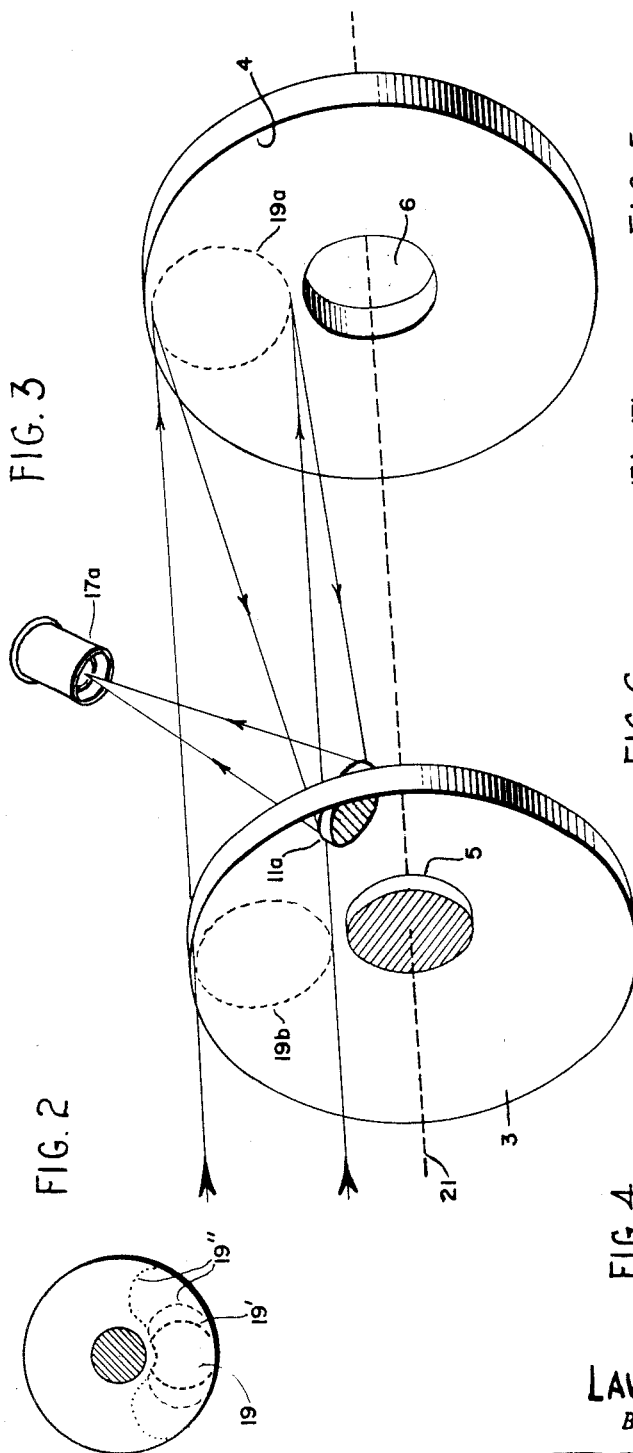
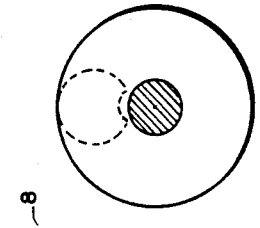
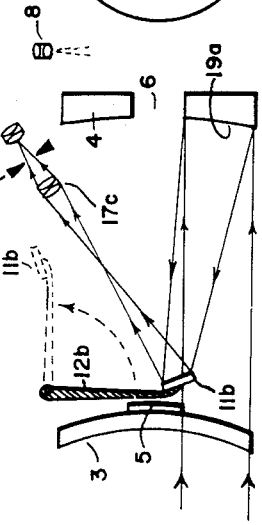
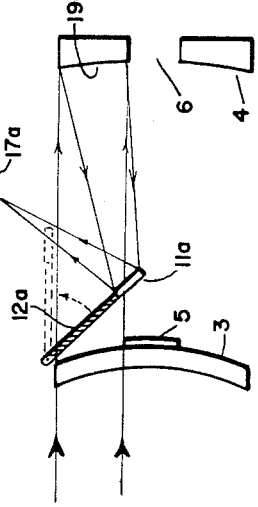
INVENTOR.
LAWRENCE E. BRAYMER
BY
His Attorney Patented Feb. 17, 1953

2,628,529

UNITED STATES PATENT OFFICE 2,628,529

REFLECTING TELESCOPE WITH AUXILIARY OPTICAL SYSTEM

Lawrence E. Braymer, Lahaska, Pa.

Application September 25, 1948, Serial No. 51,134

11 Claims. (Cl. 88—32)

My invention is an improved telescope providing a long focus, narrow angle optical system having a narrow field of view, and a short focus, wide angle optical system having a wide field of view in a single instrument of small dimensions, and in which the principal optical elements may be utilized in both optical systems concurrently or sequentially.

My invention is primarily applicable to catadioptric telescopes of the Maksutov-Cassegrain type or Maksutov-Gregorian type in which an achromatic meniscus lens, which is practically free from chromatism but has a considerable positive spherical aberration, is combined with a concave spherical mirror, or a telescopic system consisting of centered spherical mirrors, which is perfectly achromatic but has a considerable negative spherical aberration. By combining such meniscus lens and spherical mirror it is possible to correct this spherical aberration, without bringing in a noticeable chromatism and to thereby focus image rays to an image plane to form a high quality image of good achromatism from any area of the primary mirror regardless of whether the cone of rays forming the image is a right cone with respect to the common optical axis of the lens and primary mirror or forms an angle therewith.

In accordance with my invention, I utilize this property, which I have discovered, of the Maksutov-Cassegrain or Maksutov-Gregorian type of telescope to form a plurality of high quality images. The primary image is formed by a right cone of rays whose base is the effective area of the primary mirror and whose axis is coincident with the principal axis of the instrument (viz., the common axis of the lens and primary mirror). The auxiliary image is formed of a right cone of rays whose base is a relatively small portion of the area of the primary mirror and whose axis forms an acute angle with the principal axis of the instrument.

The rays forming the primary image are intercepted by a convex mirror or concave mirror, respectively within or beyond the focal length of the primary mirror, to provide an image-forming optical system of long focal length and narrow field of view. The cone of rays forming the auxiliary image are intercepted by a reflector, such as a plane mirror or total reflecting prism, to form an optical system having a focal length which is substantially the focal length of the primary mirror.

The reflector of the auxiliary optical system deflects the cone of rays intercepted thereby at an angle to the principal optical axis of the instrument to an image plane coincident with the object plane of an ocular having an optical axis forming a right or acute angle with the principal axis of the instrument.

The area of the primary mirror forming the base of the auxiliary cone of rays is preferably not intercepted by the primary axis of the instrument so as to avoid the formation of a central blind spot in the auxiliary image from the shadow of the central obstruction formed by the secondary mirror of the principal optical system. Such blind spot would result from any system utilizing the entire cone of rays from the primary mirror to form an auxiliary image and seriously impair the utility thereof.

The secondary or plane reflector of the auxiliary optical system when in use, lies primarily in the shadow of the secondary mirror of the primary optical system but without intercepting the principal axis of the instrument. It may project radially slightly beyond such shadow so as to encompass a cone of rays emanating from a larger area of the primary mirror. In such case a peripheral indentation may appear in the auxiliary image.

When the auxiliary optical system is not in use, the auxiliary mirror may be retracted out of the path of rays reflected by the primary mirror.

The principles of my invention, and the best forms in which I have contemplated applying such principles will further appear in the following description and the accompanying drawings in illustration thereof.

In the drawings, Fig. 1 is a somewhat diagrammatic, longitudinal, sectional view of a telescope of the Maksutov-Cassegrain type embodying my invention; Fig. 2 indicates, diagrammatically, clear aperture areas used in forming a short focus image; Fig. 3 is a perspective diagram illustrating a modified arrangement of the optical elements of a telescope embodying my invention; Fig. 4 is a diagrammatic longitudinal, sectional view of a telescope such as shown in Figs. 1 and 3 but with the auxiliary mirror differently positioned; Fig. 5 indicates the clear aperture area used in forming a short focus image with the auxiliary mirror arranged as shown in Fig. 4; and Fig. 6 is a diagrammatic, longitudinal, sectional view of a telescope such as shown in Figs. 1 and 3 with the auxiliary mirror and ocular so positioned as to permit viewing of a short focus image from a position adjacent to the ocular for viewing a long focus image.

In the drawings, I have shown my invention embodied in a telescope of the Maksutov-Cassegrain type such as shown in my application, Serial No. 787,995, and comprising an opaque barrel 1 having a rear end closure 2 and a front end closure consisting of an achromatic meniscus lens 3 complementary to a spherically concave mirror 4 which is movable axially in the barrel 1 for focusing. A spherically convex secondary mirror 5 is mounted on the lens 3 coaxial with the primary mirror 4, and positioned within the focal length thereof so that image rays entering the barrel through the meniscus lens 3 are converged by the primary mirror 4 on the secondary mirror 5 and thereby converged through an aperture 6 in the primary mirror 4 to the object focal plane 7 of an ocular 8 axially slideable in a radial tube 9 at the rear of the barrel 1. A reflecting surface 10 is positioned at a 45 degree angle to the common axis of the mirrors 4 and 5 so as to deflect the image rays converged by the secondary mirror 5 at right angles to the axis of the mirrors 4 and 5. Preferably, the reflector 10 consists of an Amici roof prism which not only bends the rays at a right angle but erects the image both horizontally and vertically at the plane 7.

The focal length of the mirror 4 is relatively short, e. g., two or three times its diameter, whereas, the focal length of the mirror 5 is rather long, e. g., five times the focal length of the mirror 4. Hence the lens 3 and mirror 4 form a low power image-forming optical system, whereas the lens 3 and mirrors 4 and 5 form a high power optical system of short physical length.

In accordance with my present invention, an auxiliary mirror is mounted within the telescope between the lens 3 and mirror 4 and preferably partly or wholly in the shadow of the obstruction formed by the mirror 5. The reflecting surface of the auxiliary mirror faces the primary mirror 4 at an oblique angle to the axis common to the mirrors 4 and 5 which constitutes the principal axis of the instrument. The auxiliary mirror lies between and at an oblique angle to radii of the primary mirror which do not intersect the center of the mirror 5. Hence the mirror 11 intersects image rays falling on a portion only of the surface of the mirror 4 and interposes relatively little obstruction to convergence of rays on the mirror 5 and the reflection of such rays through the aperture 6.

In the embodiment of my invention illustrated in Figs. 1 and 2, a plane mirror 11 is positioned at a point of view facing the mirror 4 by an arm 12 pivotally connected with the barrel 1 by a pivot 13. The arm 12 has a handle 14 projecting through a slot 15 in the barrel 1 and provided with limiting stops 16 for engagement with the barrel to limit the angular movement of the arm 12 and of the mirror 11 fixed thereto. An ocular 17 is mounted in a tube 18 projecting radially from the barrel 1 adjacent to the forward end thereof. The ocular 17 is on the opposite side of the principal axis of the instrument from the mirror 11 and has an optical axis coincident with the axis of the cone of rays reflected by the mirror 11 when it is moved upward by the arm 12 a predetermined distance toward the center of the barrel and wholly or partly within the shadow of the mirror 5.

When the mirror 11 is in its elevated position, image rays falling on and reflected by a relatively small portion 19 of the area of the mirror 4 are intercepted by the mirror 11 and deflected thereby, as indicated by the heavy solid lines and arrows 20, to an image focal plane 7' which is coincident with an object focal plane of the objective 17. The focal length of the optical system forming this auxiliary image is of high quality and good achromatism, due to the combined action of lens 3 and mirror 4, but is of short focal length and wide field of view, as compared with the image formed at the plane 7 by the long focus optical system including the mirror 5. If the focal length of the principal optical system of the telescope, including the mirror 5 is, say 50 inches, the focal length of the auxiliary optical system, excluding the mirror 5 but including the mirror 11, may be, say 10 inches.

The extent of the portion 19 of the area of the mirror 4 which reflects image rays to the mirror 11 and image focal plane 7' will depend upon the size, shape, and position of the mirror 11 and should be so limited as to preclude the introduction into the image formed at the plane 7' of a large central blind spot from the shadow of the central obstruction formed by the mirror 5, though there may be a small peripheral blind spot in the image due to the interception by the mirror 11 of a part of the entering beam passing from the lens 3 to the mirror 4. The area 19 will be defined by the radii of the mirror 4 intersected by the reflecting surface of the mirror 11.

Preferably the mirror 11 is slightly elliptical in contour and extends slightly into the entering beam as shown in Fig. 1, and in such case the clear aperture and consequently the image, will have a shape similar to that indicated by the heavy dotted lines 19' in Fig. 2. By increasing the major axis of an elliptical mirror 11, the clear aperture may be increased as indicated by the lenticular light dotted lines 19'' shown in Fig. 2. The effective area of the mirror 11 preferably does not extend across the common axis of the mirrors 4 and 5 nor in an arc of more than 180 degrees around such axis.

When the mirror 11 is in the position shown in Fig. 1, a viewer at the ocular 17 may observe a wide field of view, while simultaneously an observer at the ocular 8 may observe details of a narrow field of view within the wide field of view observable through the ocular 17. The oculars 8 and 17 may be of any desired magnification to satisfactorily magnify the images of their respective fields of view within the limits of acceptable brilliance of the respective images. When no observation of a wide field is required, the mirror 11 and arm 12 are folded down against the barrel, as indicated in dotted lines.

As illustrated in Figs. 3 and 4, an elliptical mirror 11a is connected with the barrel 1 by a pivoted arm 12a so that the mirror and arm may be folded up into dotted line position out of the path of rays entering the instrument or converged by the primary mirror, or may be turned downward so as to intercept radii of a portion of the area of the mirror 4 which is offset from the principal optical axis of the instrument formed by the common axis 21 of the mirrors 4 and 5 and lies on the same side of such axis as the oblique ocular 17a.

As indicated in Fig. 3, the mirror 11a is positioned to intercept rays entering the meniscus lens through the area indicated by the dotted line 19b and reflected from an area of the mirror 4 indicated by the line 19a. The mirror 11a does not occult any part of the bundle of rays passing from the area within the circle 19b to the area within the circle 19a, but intercepts the cone of image rays reflected by the area within the circle 19a and deflects such rays at an acute angle to the principal optical axis 21 to the object plane of the ocular 17a which lies mid-way of the barrel 1 and has an object plane coincident with the image plane of the optical system formed by the lens 3, mirror 4 and mirror 11a.

To increase the aperture and light gathering capacity of the mirror 11a, it may be moved, as shown in Figs. 4 and 5, so as to intercept rays converged by a larger area of the mirror 4, as for instance, an area 19c having a diameter equal to the distance between the edge surrounding the aperture 6 and the outer periphery of the mirror 4. In this position of the mirror 11a, it will intercept some of the rays passing from the lens 3 to the area 19c and thus form a peripheral dark spot in the image. The shifting of the position of the mirror 11a may necessitate a shifting of the ocular 17a to bring its object plane into coincidence with the image plane of the mirrors 4 and 11a.

As illustrated in Fig. 6, the elements of the optical systems may be so correlated as to bring the ocular of the primary system and the ocular of the auxiliary system adjacent to one another at the rear of the telescope so as to permit concurrent or substantially concurrent wide angle viewing and narrow angle viewing where a fully erected image is desired also in the auxiliary system. In this arrangement, the plane mirror 11b is connected with the barrel 1 by a hinged arm 12b which is of such length as to position the mirror 11b on the opposite side of the common optical axis of the mirrors 4 and 5 from the ocular 17b which is positioned adjacent to the ocular 8. In this instance, the mirror 11b reflects rays from an area 19d of the mirror 4, which area has a diameter equal to the distance between the edge surrounding the aperture 6 and the outer periphery of the mirror 4. If desired, the cone of rays reflected by the mirror 11b can be lengthened and the image formed thereby erected by the interposition of an erecting lens 17c, and most of the extraneous light may be cut off by a diaphragm stop 17d.

The erecting lens 17c not only provides an erect image but so lengthens the ray path of the auxiliary system as to permit the ocular 17b to be placed at or near the rear closure in desired proximity to the ocular 8 and also provides a limited variable power for the auxiliary system by moving the erecting lens axially a distance up to approximately twice or thrice its diameter.

Since the hinged supporting arms for the auxiliary mirrors are made of thin metal stampings and present only a narrow blade to the entering light, the obstruction of diffraction effects thereof are not serious and have consequently been ignored in the diagrams shown in Figs. 2 and 5.

It will be understood that when a low power, wide angle optical system is required for locating celestial or terrestrial objects, or for observation of comets, nebulae and so forth, the auxiliary mirror is positioned to permit the viewing through an ocular 17, 17a or 17b, of an image formed by the lens 3 and mirror 4, and reflected by the mirror 11, 11a or 11b. The high power, narrow field optical system formed by the lens 3 and mirrors 4 and 5, prism 10 and ocular 8 may be simultaneously used. When, however, low power, wide angle observation is unnecessary, the auxiliary mirror may be folded back against the barrel of the instrument.

Having described my invention, I claim:

1. A telescope comprising a primary concave mirror, an achromatic meniscus lens complementary to said mirror and axially spaced therefrom along an axis common to said mirror and lens, a secondary mirror between said lens and primary mirror and having a curved face complementary to said primary mirror and forming with a part thereof an image-forming optical system, an ocular in operative relation to the image plane of said optical system, and an auxiliary reflector between said lens and primary mirror and having a reflecting surface facing said primary mirror and forming an oblique angle with the said common axis, said auxiliary reflector and another part of said primary mirror forming an image forming optical system of shorter focal length than said first system, and an ocular in operative relation with the image plane of said second system.

2. A telescope as set forth in claim 1 wherein the auxiliary reflector lies at least partly within the shadow of the secondary mirror, but leaves the bulk of the area thereof unobstructed.

3. A telescope as set forth in claim 1 wherein the reflecting surface of the auxiliary reflector is at an acute angle to the common axis and on the opposite side of said axis from the ocular complementary to said auxiliary reflector.

4. A telescope as set forth in claim 1 wherein the auxiliary reflector is movable about an axis and toward and from the common axis.

5. A telescope comprising a concave primary mirror of relatively short focus and containing a central aperture, an achromatic lens axially spaced from said mirror along a common axis and having centrally thereon a curved secondary mirror coacting with a major portion of said primary mirror to form an image forming optical system of relatively long focus, having an image plane on the opposite side of said primary mirror from said secondary mirror, an auxiliary reflector adjacent to said secondary mirror and at least partly in the shadow of said secondary mirror but leaving at least the major portion of said secondary mirror unobstructed when viewed through said aperture, said auxiliary reflector having a reflecting surface oblique to said common axis and in the path of rays reflected by a minor portion only of said primary mirror between its aperture and periphery, and an ocular aligned with said reflector and having an optical axis oblique to said common axis.

6. A telescope comprising a concave primary mirror, a secondary mirror positioned in front of said primary mirror and having a common axis therewith, said secondary mirror having a curved reflecting surface reflecting rays converged by said primary mirror back toward the center thereof, an ocular in the path of rays reflected by said secondary mirror, and a third mirror positioned in front of said primary mirror and having a reflecting surface forming an oblique angle with said common axis and reflecting rays converged by a portion of said primary mirror away from the surface of said primary mirror, and an ocular in the path of rays reflected by said third mirror.

7. A telescope as set forth in claim 1 in which the ocular complementary to the auxiliary reflector has its axis oblique to said common axis.

8. A telescope as set forth in claim 1 in which the ocular complementary to the auxiliary reflector has its optical axis transverse to said common axis, and said auxiliary reflector and ocular are wholly on opposite sides of said common axis.

9. A telescope comprising an image-forming optical system of long focus and an image-forming optical system of short focus, said systems each including a portion of a common concave spherical primary mirror and a correcting lens axially spaced from said mirror along a common axis, and having an aberration tending to correct aberration of said primary mirror; said long focus system also including a secondary spherical mirror having an axis concentric with said common axis and disposed between said primary mirror and lens in position to receive rays reflected from at least the major portion of said primary mirror, a reflector in the path of image rays reflected from said secondary mirror and having a reflecting surface intersecting said common axis and disposed at an oblique angle thereto, and an ocular in the path of rays reflected by said reflector; and said short focus system also including an auxiliary reflector in the path of rays reflected by a minor portion only of said primary mirror and having a reflecting surface offset from said common axis and disposed at an oblique angle thereto, and an ocular in the path of rays reflected by said auxiliary reflector; said auxiliary reflector leaving a major portion of said secondary mirror unobstructed when viewed along said common axis from said primary mirror.

10. A telescope having a short focus wide angle optical system having a wide field of view and a long focus narrow angle optical system having a narrow field of view within said first named field of view; said systems including portions of a common spherical primary mirror, containing a central aperture, and a correcting lens axially spaced from said mirror along a common axis and having an aberration tending to correct aberrations in said portions of said primary mirror; said long focus system also including a spherical mirror coaxial with, and spaced from, said primary mirror and reflecting rays emanating from the major portion of said primary mirror through the aperture therein; said short focus system also including a reflector between said primary mirror and said secondary mirror and having a reflecting surface oblique to the common axis of said primary mirror and secondary mirror, said reflector leaving a major portion of said secondary mirror unobstructed when viewed through said aperture; and oculars in the path of rays reflected by said secondary mirror and by said reflector respectively; said short focus system providing a finder for locating a field of view for said long focus system.

11. A telescope comprising an image-forming optical system of short focal length and an image-forming optical system having a focal length longer than the focal length of said first system; said systems each including a portion of a common concave spherical primary mirror and a correcting lens axially spaced from said mirror along a common axis and having an aberration tending to correct aberrations of said portions of said primary mirror; said short focus system including a reflector having a reflecting surface offset from said common axis and disposed at an oblique angle thereto, said reflecting surface being in the path of a right cone of rays, whose base is a relatively small portion of the area of the primary mirror lying between its central aperture and outer periphery, the axis of such right cone of rays forming an acute angle with said common axis, and an erecting lens and an ocular in the path of rays reflected by said reflecting surface; and said long focus system including a secondary mirror in the path of rays emanating from the major portion of said primary mirror, and an ocular in the path of rays reflected by said secondary mirror; said short focus system forming a finder of a field of view for said long focus system.

LAWRENCE E. BRAYMER.

REFERENCES CITED

The following references are of record in the file of this patent:

UNITED STATES PATENTS

| Number | Name | Date |
|---|---|---|
| 828,511 | Saegmuller | Aug. 14, 1906 |
| 991,652 | Saegmuller | May 9, 1911 |
| 1,086,140 | Cleary | Feb. 3, 1914 |
| 1,578,899 | Lohmann | Mar. 30, 1926 |
| 2,021,533 | Wolfe | Nov. 19, 1935 |
| 2,409,186 | Bouwers | Oct. 15, 1946 |
| 2,504,383 | Bouwers et al. | Apr. 18, 1950 |

FOREIGN PATENTS

| Number | Country | Date |
|---|---|---|
| 234,156 | Switzerland | Dec. 16, 1944 |

OTHER REFERENCES

Maksutov: Article in Journal of the Optical Society of America on "New Catadioptric Lens Systems", May 1944, pages 278–280, Publ. by American Institute of Physics, New York city. Copy in Div. 7.